(12) United States Patent
Wang et al.

(10) Patent No.: US 11,933,144 B2
(45) Date of Patent: Mar. 19, 2024

(54) METHODS AND APPARATUS FOR OFFSHORE POWER GENERATION FROM A GAS RESERVOIR (71) Applicant: ExxonMobil Technology and Engineering Company, Spring, TX (US)

(72) Inventors: Rui Wang, Millbrae, CA (US); Mark Christian Ausborn, Houston, TX (US); Zhen Li, Houston, TX (US); Elliot M. Chang-Tang, Houston, TX (US)

(73) Assignee: ExxonMobil Technology and Engineering Company, Spring, TX (US)

( * ) Notice: Subject to any disclaimer, the term of this patent is extended or adjusted under 35 U.S.C. 154(b) by 0 days.

(21) Appl. No.: 17/594,218

(22) PCT Filed: Jul. 1, 2021

(86) PCT No.: PCT/US2021/040045
§ 371 (c)(1),
(2) Date: Oct. 7, 2021

(87) PCT Pub. No.: WO2022/015515
PCT Pub. Date: Jan. 20, 2022

(65) Prior Publication Data
US 2023/0166969 A1 Jun. 1, 2023

Related U.S. Application Data (60) Provisional application No. 63/051,676, filed on Jul. 14, 2020.

(51) Int. Cl.
E21B 41/00 (2006.01)
B63B 35/44 (2006.01)
(Continued)

(52) U.S. Cl.
CPC .......... *E21B 41/0064* (2013.01); *B63B 35/44* (2013.01); *C01B 3/382* (2013.01);
(Continued)

(58) Field of Classification Search
CPC . C01B 3/382; C01B 3/388; C01B 2203/0233; C01B 2203/068;
(Continued)

(56) References Cited

U.S. PATENT DOCUMENTS 7,299,868 B2 * 11/2007 Zapadinski ......... E21B 41/0064
166/57
7,481,275 B2 * 1/2009 Olsvik ...................... C01B 3/36
166/305.1
(Continued)

FOREIGN PATENT DOCUMENTS

NL 2019056 B1 12/2018
WO 2014182565 A2 11/2014
WO 2019204857 A1 10/2019

OTHER PUBLICATIONS

Roussanaly et al., "Offshore Power Generation with Carbon Capture and Storage to Decarbonise Mainland Electricity and Offshore Oil and Gas Installations: A Techno-economic Analysis", Applied Energy, 2019, vol. 233-234, pp. 478-494.
(Continued)

*Primary Examiner* — Brad Harcourt
(74) *Attorney, Agent, or Firm* — ExxonMobil Technology and Engineering Company—Law Department (57) ABSTRACT Offshore systems and methods may be configured for offshore power generation and carbon dioxide injection for enhanced gas recovery for gas reservoirs. For example, a method may include: providing an offshore facility including a gas turbine, and a gas separator; producing a produced gas from a gas reservoir to the offshore facility; combusting
(Continued)

the produced gas in a gas turbine to produce power and a flue gas; at least partially removing nitrogen from the flue gas in a gas separator to produce a carbon dioxide-enriched flue gas and a nitrogen-enriched flue gas; compressing the carbon dioxide-enriched flue gas in a gas compressor to produce a compressed gas; and injecting the compressed gas from the gas compressor into the gas reservoir, wherein 80 mol % or more of hydrocarbon in the produced gas is combusted and/or injected into the gas reservoir.

24 Claims, 3 Drawing Sheets

(51) Int. Cl.
    *C01B 3/38*     (2006.01)
    *E21B 43/01*     (2006.01)
    *E21B 43/16*     (2006.01)
    *E21B 43/40*     (2006.01)

(52) U.S. Cl.
CPC .......... *C01B 3/388* (2013.01); *E21B 43/0107* (2013.01); *E21B 43/164* (2013.01); *E21B 43/40* (2013.01); *B63B 2035/444* (2013.01); *C01B 2203/0233* (2013.01); *C01B 2203/068* (2013.01); *C01B 2203/1235* (2013.01); *C01B 2203/84* (2013.01)

(58) Field of Classification Search
CPC ........ C01B 2203/1235; C01B 2203/84; C01B 2203/0405; C01B 2203/0415; C01B 2203/046; C01B 3/384; C01B 3/48; B63B 35/44; B63B 2035/444; E21B 41/0064; E21B 43/0107; E21B 43/164; E21B 43/40; F02C 6/00; F05D 2260/61; F05D 2260/611; Y02P 20/52; Y02P 90/70
See application file for complete search history.

(56) References Cited

U.S. PATENT DOCUMENTS

| | | | |
|---|---|---|---|
| 2007/0215350 A1* | 9/2007 | Kresnyak | E21B 41/0064 166/305.1 |
| 2008/0017369 A1* | 1/2008 | Sarada | E21B 43/40 166/266 |
| 2011/0174401 A1* | 7/2011 | Stevens | C01B 32/50 137/565.17 |
| 2012/0193103 A1* | 8/2012 | Hall | E21C 50/00 166/344 |
| 2015/0240715 A1* | 8/2015 | Dhanuka | C10L 3/06 60/39.182 |
| 2018/0230778 A1* | 8/2018 | Thrash | C09K 8/80 |
| 2019/0063252 A1* | 2/2019 | Spears | H05K 7/20745 |
| 2020/0378543 A1* | 12/2020 | Shepherd | E21B 36/003 |

OTHER PUBLICATIONS

Roussanaly et al., "Clean Electricity Production from Offshore Natural Gas", GHGT-14, https://az659834.vo.msecnd.net/eventsairwesteuprod/production-ieaghg-public/2a8cc6c4a64b4c949cc2e83b2cb7f264.

Roussanaly et al., "Clean Electricity Production from Offshore Natural Gas", https://blog.sintef.com/sintefenergy/gas-technology/clean-electricity-production-from-offshore-natural-gas/.

* cited by examiner

METHODS AND APPARATUS FOR OFFSHORE POWER GENERATION FROM A GAS RESERVOIR

CROSS REFERENCE TO RELATED APPLICATIONS

This application is a National Phase Application of PCT Application No. PCT/US2021/040045, filed Jul. 1, 2021, which claims the benefit of U.S. Provisional Application No. 63/051,676, filed Jul. 14, 2020, the disclosures of which are incorporated herein by reference in their entireties.

FIELD OF THE INVENTION

The present disclosure relates to systems and methods for offshore power generation and carbon dioxide injection for enhanced gas recovery (EGR) for gas reservoirs.

BACKGROUND OF THE INVENTION

Exploration and production of offshore gas reservoirs are increasing globally. Produced gas from an offshore gas reservoir typically has little to no liquid hydrocarbons. Therefore, the produced gas is typically compressed and transported by tanker or pipeline to onshore facilities. The compression and transportation of the produced gas is an energy-intensive and high cost process. Only select offshore gas reservoirs that are typically reasonably close to shore are viable for gas production because the production and transportation costs outweigh the hydrocarbon gas value.

SUMMARY OF THE INVENTION

The present disclosure relates to systems and methods for offshore power generation and carbon dioxide injection for EGR for gas reservoirs.

Disclosed herein are methods that comprise: providing an offshore facility comprising a gas turbine, and a gas separator; producing a produced gas from a gas reservoir to the offshore facility; combusting the produced gas in a gas turbine to produce power and a flue gas; at least partially removing nitrogen from the flue gas in a gas separator to produce a carbon dioxide-enriched flue gas and a nitrogen-enriched flue gas; compressing the carbon dioxide-enriched flue gas in a gas compressor to produce a compressed gas; and injecting the compressed gas from the gas compressor into the gas reservoir, wherein 80 mol % or more of hydrocarbon in the produced gas is combusted and/or injected into the gas reservoir.

Disclosed herein are offshore facilities that comprise: an offshore production unit configured for producing a produced gas from a gas reservoir; a gas turbine configured to receive the produced gas for producing power and a flue gas; a gas separator configured to receive the flue gas for at least partially removing nitrogen from the flue gas and for producing a carbon dioxide-enriched flue gas and a nitrogen-enriched flue gas; a gas compressor configured to receive the carbon dioxide-enriched flue gas for producing a compressed gas; and an injection unit configured for injecting the compressed gas from the gas compressor into the gas reservoir.

Disclosed herein are methods that comprise: providing an offshore facility comprising a gas turbine, a first gas separator, a reformer, a second gas separator, and an ammonia reactor; producing a produced gas from a gas reservoir to the offshore facility; combusting the produced gas in a gas turbine to produce power and a flue gas; at least partially removing nitrogen from the flue gas in the first gas separator to produce a carbon dioxide-enriched flue gas and a nitrogen-enriched flue gas; reforming a portion of the produced gas in the reformer to produce a stream comprising hydrogen and carbon dioxide; at least partially separating the carbon dioxide in the second gas separator from the stream to yield a carbon dioxide stream and a hydrogen stream; reacting the hydrogen stream and the nitrogen-enriched flue gas in the ammonia reactor to yield ammonia; combining and compressing the carbon dioxide stream and the carbon dioxide-enriched flue gas in a gas compressor to produce a compressed gas; and injecting the compressed gas from the gas compressor into the gas reservoir, wherein 80 mol % or more of hydrocarbon in the produced gas is combusted, reformed, and/or injected into the gas reservoir.

Disclosed herein are offshore facilities that comprise: an offshore production unit configured for producing a produced gas from a gas reservoir; a gas turbine configured to receive the produced gas for producing power and a flue gas; a first gas separator configured to receive the flue gas for at least partially removing nitrogen from the flue gas and for producing a carbon dioxide-enriched flue gas and a nitrogen-enriched flue gas; a reformer configured to receive a portion of the produced gas from upstream of the gas turbine for producing a stream comprising carbon dioxide and hydrogen; a second gas separator configured to receive the stream for at least partially removing carbon dioxide from the stream and for producing a carbon dioxide stream and a hydrogen stream; an ammonia reactor configured to receive the hydrogen stream and the nitrogen-enriched flue gas for producing ammonia; a gas compressor configured to receive the carbon dioxide-enriched flue gas and the carbon dioxide stream for producing a compressed gas; and an injection unit configured for injecting the compressed gas from the gas compressor into the gas reservoir.

BRIEF DESCRIPTION OF THE DRAWINGS

The following figures are included to illustrate certain aspects of the present disclosure and should not be viewed as exclusive embodiments. The subject matter disclosed is capable of considerable modifications, alterations, combinations, and equivalents in form and function, as will occur to one having ordinary skill in the art and having the benefit of this disclosure.

DETAILED DESCRIPTION OF THE INVENTION

The present disclosure relates to systems and methods for offshore power generation and carbon dioxide injection for EGR for gas reservoirs. Advantageously, the systems and methods described herein include offshore facilities that produce power as the primary or only product export, which is lower cost to transport compared to compressed gas. In one example, said power may be transported onshore. Additionally or alternatively, the power may be transported to nearby offshore facilities that may be tapping the same gas reservoir, where these nearby offshore facilities use the power, at least in part, to compress the produced gas. Having power readily available may allow for placing gas production, compression, and transportation facilities further from shore and tap resources that are not currently economically viable.

Generally, the methods and systems described herein relate to offshore facilities that convert gas produced from a reservoir (produced gas) into power via combustion with $CO_2$ being a byproduct that can be injected back into the reservoir for EGR. Herein, the power can be (a) consumed locally on the offshore facility for additional gas production, (b) exported to nearby, offshore facilities producing gas and/or other hydrocarbons, or (c) exported to onshore markets. Alternately, the markets can be placed offshore.

Offshore facilities have limited space and often require significant amounts of power to operate. The power-generating offshore facilities and related methods of the present disclosure advantageously allow for reducing the space requirements for power-generating equipment on other offshore, exploration and production facilities. This allows for including other equipment on such facilities that may be valuable in the exploration and production of hydrocarbons.

Further, power-generating offshore facilities and related methods of the present disclosure advantageously produce $CO_2$ on-site. Said $CO_2$ can be used for EGR of the reservoir, which increases the production of the nearby offshore, exploration and production facilities while also reducing costs related to transporting EGR materials like $CO_2$ from onshore sites to the offshore site.

Additionally, power-generating offshore facilities and related methods of the present disclosure optionally include ammonia production capabilities. Ammonia is mainly produced through the Haber-Bosch process using fossil fuels like natural gas and coal. Natural gas based ammonia production can release about 2.7 metric tons of carbon dioxide for every ton of ammonia produced. Natural gas can be converted into gaseous hydrogen via a series of processes (e.g., sulfur removal from the feedstock to form a sulfur-free feedstock; catalytic steam reforming of the sulfur-free feedstock to form hydrogen and carbon monoxide; catalytic shift conversion to convert the carbon monoxide to carbon dioxide and more hydrogen; catalytic methanation to remove any small residual amounts of carbon monoxide or carbon dioxide from the hydrogen). The produced gaseous hydrogen can be used for the ammonia production. Herein, methods of the present disclosure provide a solution for the ammonia production where a portion of the produced gas from the reservoir is used as a feedstock gas for the ammonia production. The combustion in the gas turbine uses air, so the flue gas therefrom includes a significant amount of nitrogen. In the methods and systems described herein, nitrogen is removed from the flue gas so that the injection fluid has a higher $CO_2$ concentration. Further, the ammonia production yields carbon dioxide, which can be directed back into the main process or system for compression and injection into the reservoir.

The new notation for the Periodic Table Groups is used as described in Chemical and Engineering News, 63(5), 27 (1985).

The following abbreviations are used herein: EGR is enhanced gas recovery; mol % is mole percent; BTU is British thermal unit; and MMSCFD is million standard cubic feet per day.

All numerical values within the detailed description and the claims herein are modified by "about" or "approximately" with respect to the indicated value, and take into account experimental error and variations that would be expected by a person having ordinary skill in the art. Unless otherwise indicated, ambient temperature (room temperature) is from about 18° C. to about 20° C.

As used in the present disclosure and claims, the singular forms "a," "an," and "the" include plural forms unless the context clearly dictates otherwise.

The term "and/or" as used in a phrase such as "A and/or B" herein is intended to include "A and B," "A or B," "A," and "B."

Where the term "between" is used herein to refer to ranges, the term encompasses the endpoints of the range. That is, "between 2% and 10%" refers to 2%, 10% and all percentages between those terms.

As used herein, the term "gas reservoir" refers to a hydrocarbon reservoir where the produced hydrocarbon is at least 90 mol % $C_1$-$C_4$ hydrocarbon gas. Other gaseous species like carbon dioxide and hydrogen sulfide may be components in the material produced from the reservoir.

As used herein, the term "offshore" relates to a device, structure, or installation located on, within, or at the bottom (subsea) of water.

The term "hydrocarbon" refers to a class of compounds having hydrogen bound to carbon, and encompasses (i) saturated hydrocarbon compounds, (ii) unsaturated hydrocarbon compounds, and (iii) mixtures of hydrocarbon compounds (saturated and/or unsaturated), including mixtures of hydrocarbon compounds having different numbers of carbon atoms. The term "$C_n$" refers to hydrocarbon(s) or a hydrocarbyl group having n carbon atom(s) per molecule or group, wherein n is a positive integer. Such hydrocarbon compounds may be one or more of linear, branched, cyclic, acyclic, saturated, unsaturated, aliphatic, or aromatic, with optional substitution being present in some cases.

The term "$C_n$" group or compound refers to a group or a compound comprising carbon atoms at a total number of n. Thus, a "$C_m$-$C_n$" group or compound refers to a group or compound comprising carbon atoms at a total number thereof in the range from m to n. Thus, a $C_1$-$C_{50}$ alkyl group refers to an alkyl group comprising carbon atoms at a total number thereof in the range from 1 to 50.

The terms "hydrocarbyl" and "hydrocarbyl group" are used interchangeably herein. The term "hydrocarbyl group" refers to any $C_1$-$C_{100}$ hydrocarbon group bearing at least one unfilled valence position when removed from a parent compound. Suitable "hydrocarbyl" and "hydrocarbyl groups" may be optionally substituted.

The term "alkyl" refers to a hydrocarbyl group having no unsaturated carbon-carbon bonds, and which may be optionally substituted.

The term "aryl" is equivalent to the term "aromatic" as defined herein. The term "aryl" refers to both aromatic compounds and heteroaromatic compounds, which may be optionally substituted. Both mononuclear and polynuclear aromatic compounds are encompassed by these terms.

The term "substituted" refers to replacement of at least one hydrogen atom or carbon atom of a hydrocarbon or hydrocarbyl group with a heteroatom or heteroatom functional group. Heteroatoms may include, but are not limited to, B, O, N, S, P, F, Cl, Br, I, Si, Pb, Ge, Sn, As, Sb, Se, and Te. Heteroatom functional groups that may be present in substituted hydrocarbons or hydrocarbyl groups include, but are not limited to, functional groups such as O, S, S=O, $S(=O)_2$, $NO_2$, F, Cl, Br, I, $NR_2$, OR, SeR, TeR, $PR_2$, $AsR_2$, $SbR_2$, SR, $BR_2$, $SiR_3$, $GeR_3$, $SnR_3$, $PbR_3$, where R is a hydrocarbyl group or H. Suitable hydrocarbyl R groups may include alkyl, alkenyl, alkynyl, aryl, heteroaryl, cycloalkyl, heterocyclyl, and the like, any of which may be optionally substituted.

The term "optionally substituted" means that a hydrocarbon or hydrocarbyl group may be unsubstituted or substituted. Unless otherwise specified, any of the hydrocarbyl groups herein may be optionally substituted.

As used herein, the term "reservoir" refers to a subsurface body of rock having sufficient porosity and permeability to store and transmit fluids.

As used herein, a "gas turbine" refers to a combustion engine that can convert natural gas or other fluid fuels to mechanical energy. This energy then drives a generator that produces electrical energy.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present disclosure. At the very least, and not as an attempt to limit the application of the doctrine of equivalents to the scope of the claim, each numerical parameter should at least be construed in light of the number of reported significant digits and by applying ordinary rounding techniques.

One or more illustrative embodiments incorporating the present disclosure embodiments disclosed herein are presented herein. Not all features of a physical implementation are described or shown in this application for the sake of clarity. It is understood that in the development of a physical embodiment incorporating the embodiments of the present disclosure, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

While compositions and methods are described herein in terms of "comprising" or "having" various components or steps, the compositions and methods can also "consist essentially of" or "consist of" the various components and steps.

As discussed above, the present disclosure relates to systems and methods for offshore power generation, $CO_2$ capture, and $CO_2$ injection for EGR in a gas reservoir. Optionally, ammonia production can also be included in the offshore systems and methods of the present disclosure.

Figure 1:
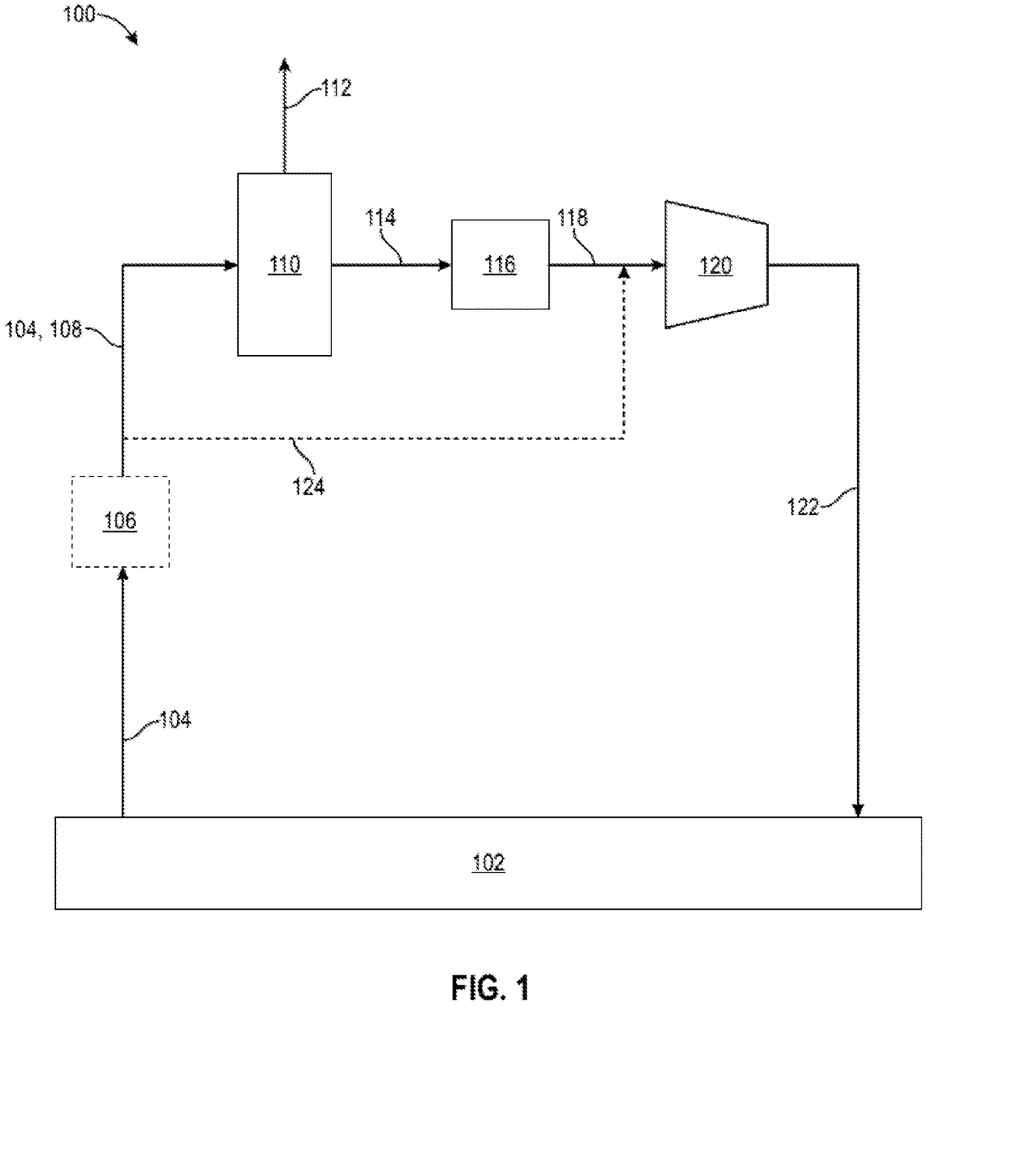
FIG. 1 is a non-limiting example flow diagram of a method for power generation and $CO_2$ injection of the present disclosure.

FIG. 1 is a non-limiting example flow diagram of a method 100 for power generation and $CO_2$ injection of the present disclosure. Generally, methods for offshore power generation and $CO_2$ injection according to the present disclosure may comprise: combusting a produced gas 104 from a gas reservoir 102 in a gas turbine 110 to produce power 112 and a flue gas 114; at least partially removing nitrogen from the flue gas 114 in a gas separator 116 to produce a carbon dioxide-enriched flue gas 118 and a nitrogen-enriched flue gas (not illustrated); compressing the carbon dioxide-enriched flue gas 118 in a gas compressor 120 to produce a compressed gas 122; and injecting the compressed gas 122 into the reservoir 102.

Herein, the term "produced gas" refers to the material (e.g., comprising gas and/or liquid) produced from the gas reservoir. Produced gas 104 may comprise: water (e.g., as steam), hydrogen, helium, nitrogen, carbon monoxide, carbon dioxide, hydrogen sulfide, gas hydrocarbons (e.g., methane, ethane, propane, butane), liquid hydrocarbons (e.g., pentane and heavier hydrocarbons, such as $C_8$ hydrocarbons), metal-containing compounds (e.g., mercury), and the like, and any combination thereof.

Produced gas 104 may have a hydrocarbon content of about 50 mol % to about 100 mol % (or about 50 mol % to about 75 mol %, or about 60 mol % to about 90 mol %, or about 85 mol % to about 100 mol %) based on the total moles of the produced gas 104, where about 90 mol % or greater (or about 90 mol % to about 100 mol %, or about 95 mol % to about 100 mol %) of the hydrocarbons in the produced gas 104 are a $C_1$-$C_4$ hydrocarbons.

Produced gas 104 may have a helium content of 0 mol % to about 20 mol % (or about 0.05 mol % to about 17.5 mol %, or about 0.1 mol % to about 15 mol %, or about 0.5 mol % to about 12.5 mol %, or about 1.5 mol % to about 10 mol %, or about 2 mol % to about 7.5 mol %, or about 2.5 mol % to about 5 mol %), based on the total mole percent of the produced gas 104.

Produced gas 104 may have a nitrogen content of about 0.01 mol % to about 50 mol % (or about 0.03 mol % to about 45 mol %, or about 0.05 mol % to about 40 mol %, or about 0.1 mol % to about 35 mol %, or about 0.15 mol % to about 30 mol %), based on the total mole percent of the produced gas 104.

Produced gas 104 may have a carbon dioxide content of about 50 mol % or less (or 0 mol % to about 80 mol %, or 0 mol % to about 5 mol %, or about 0.5 mol % to about 10 mol %, or about 5 mol % to about 25 mol %, or about 20 mol % to about 50 mol %, or about 30 mol % to about 50 mol %), based on the total mole percent of the produced gas 104.

Produced gas 104 may have a hydrogen sulfide content of 0 mol % to about 30 mol % (or about 0.01 mol % to about 25 mol %, or about 0.05 mol % to about 20 mol %, or about 0.1 mol % to about 15 mol %), based on the total mole percent of the produced gas 104.

Components in produced gas 104 like carbon dioxide and nitrogen can reduce the BTU of the produced gas 104 (e.g., at a combined carbon dioxide and nitrogen content of about 25 mol % or greater (or about 25 mol % to about 65 mol %, or about 25 mol % to about 40 mol %, or about 30 mol % to about 50 mol %, or about 35 mol % to about 60 mol %) based on the total mole percent of the produced gas 104). Furthermore, hydrogen sulfide and/or metal-containing compounds (e.g., mercury) can be poisonous to catalysts in downstream steps. Therefore, the methods and systems of the present disclosure may further include removing one or more components from the produced gas 104 using one or more purification units 106 to yield a purified produced gas 108 that is combusted in the gas turbine 110. Examples of gas separation methods at least partially removing carbon dioxide from the produced gas include, but are not limited to, a membrane filtration process, a cold fraction process, an extractive distillation, and the like, and any combination thereof (each described further herein). Examples of methods for at least partially removing hydrogen sulfide from produced gas 104 include, but are not limited to, hydrogen scavenging methods using liquids and/or high surface area materials (e.g., described in U.S. Pat. Nos. 5,128,049, 5,462,721, 6,136,282, 8,133,302, and 10,343,107 and U.S. Pat. App. Pub. No. 2015/0027056, each of which is incorporated herein by reference), and the like, and any combination thereof. Examples of methods for at least partially removing metal-containing compounds from produced gas 104 include, but are not limited to, adsorption by porous materials and/or polymeric membranes (e.g., described in in U.S. Pat. No. 5,463,167 and International Pat. App. Pub. No. WO/2013/142325, each of which is incorporated herein by reference), mercury scavenger solutions (e.g., described in U.S. Pat. No. 6,475,451, which is incorporated herein by reference), and the like, and any combination thereof.

Further, where the one or more purification units 106 are for removing carbon dioxide from the produced gas 104, the carbon dioxide can be used in the method 100 downstream to be combined with the carbon dioxide-enriched flue gas 118 before compression and injection.

Produced gas 104 has a gas volume of about 1 MMSCFD or greater (or about 5 MMSCFD or greater, or about 10 MMSCFD or greater, or about 15 MMSCFD or greater, or about 20 MMSCFD or greater, or about 25 MMSCFD or greater, or about 30 MMSCFD or greater, or about 35 MMSCFD or greater, or about 40 MMSCFD or greater, or about 45 MMSCFD or greater, or about 50 MMSCFD or greater, or about 100 MMSCFD or greater, or about 150 MMSCFD or greater, or about 200 MMSCFD or greater, or about 250 MMSCFD or greater, or about 300 MMSCFD or greater, or about 350 MMSCFD or greater, or about 400 MMSCFD or greater, or about 450 MMSCFD or greater, or about 500 MMSCFD or greater). The produced gas may have a gas volume of about 50 MMSCFD to about 500 MMSCFD (or about 60 MMSCFD to about 400 MMSCFD, or about 70 MMSCFD to about 300 MMSCFD, or about 80 MMSCFD to about 200 MMSCFD).

Gas turbine 110 may have a gas volume capacity of about 1 MMSCFD or greater (such as about 50 MMSCFD to about 500 MMSCFD). When the volume of the produced gas 104 is (a) greater than the capacity of the gas turbine 110 and/or (b) greater than needed to produce a desired amount of power 112, a portion 124 of the produced gas 104 may be diverted from upstream of the gas turbine 110 to be mixed with the carbon dioxide-enriched flue gas 118 before compression and injection.

Combusting a produced gas 104 (or purified produced gas 108) in a gas turbine 110 to produce power 112 and a flue gas 114 can be carried out in a gas-fired power generation unit, wherein an optimal combustion of the produced gas, in the presence of air, can be determined using the following equation:

$$C_xH_y + \alpha(O_2 + 3.76N_2) \rightarrow xCO_2 + (y/2)H_2O + 3.76\alpha N_2$$

wherein $\alpha = x + y/4$ (Stoichiometric), and
wherein $C_xH_y$ refers to hydrocarbon(s) or a hydrocarbyl group having "x" carbon atom(s) per molecule or group, wherein x is a positive integer (e.g., x can be 1, 2, 3, 4, 5, etc., such as x can be from 1 to 4), and "y" hydrogen atom(s) per molecule or group such as $y = 2x + 2$, wherein y is a positive integer.

Gas turbines may have fuel flexibility which allows the turbines to consume various fuels other than methane-majored natural gas. Specifically, in embodiments of the present disclosure, the gas turbine can consume low-BTU gases with high inerts (e.g., $CO_2$ and $N_2$), and/or Syngas (e.g., $H_2$ and CO, and $H_2S$). Accordingly, methods of the present disclosure enable the cost reduction of the gas separation process. Furthermore, methods of the present disclosure enable the gas turbines to operate at higher power output with similar efficiency compared with the same equipment firing pipeline quality natural gas. For instance, suitable examples of gas turbine for power generation of up to 50 megaWatts can be a heavy-duty gas turbine 9F (50 Hz) from GENERAL ELECTRIC POWER®, and/or 9E.03/.04 heavy-duty gas turbine from GENERAL ELECTRIC POWER®. Depending on the power generation capacity, a plurality of gas turbines may be employed and arranged based on the floater type (e.g., a semi-submersible or ship-shaped monohull structure).

The power 112 can be (a) consumed locally, (b) exported to nearby offshore facilities (e.g., exploration and/or production offshore facilities, also referred to herein as production platforms), or (c) exported to onshore markets. The power output of method 100 can vary from several mega-Watts (MW) (which can be used locally) to gigaWatts (GW). For example, the power can be from 500 MW to 3 GW.

The power 112 can be at high voltage alternative current (HVAC), at high voltage direct current (HVDC), or a combination of both. Preferably, for lower power capacity and shorter distance, power can be at HVAC. For higher power capacity and longer distance, HVDC is preferred. Power 112 can be exported from the offshore facility via battery ships and/or cables.

The flue gas 114 passes from the gas turbine 110 to the gas separator 116 where at least partial removal of nitrogen from the flue gas 114 is carried out to produce carbon dioxide-enriched flue gas 118 and nitrogen-enriched flue gas (not illustrated). If needed, sea water may be used for cooling flue gas 114 before separation.

Water is a product of the combustion process. The cooling of the flue gas between the gas turbine 110 and gas separator 116 may condense from flue gas 114 to produce liquid water (not illustrated). The water can be collected and injected with the compressed gas 122 into reservoir 102 as an additional EGR fluid.

$CO_2$ separation may comprise a separation process selected from a group consisting of: a membrane filtration process, a cold fraction process, an extractive distillation, and the like, and any combination thereof. These are described further herein.

The carbon dioxide-enriched flue gas 118 passes from the gas separator 116 to the gas compressor 120 where carbon dioxide-enriched flue gas 118 is compressed in the gas compressor 120 to produce a compressed gas 122. The gas compressor 120 may use the electricity generated from the onboard power plant produced by the gas turbine 110. The compressed gas 122 can be injected from gas compressor 120 into the gas reservoir 102.

The compressed gas 122 and, optionally, the condensed water from the flue gas 114 can be injected into a porous and permeable gas reservoir 102 where the injected compressed gas 122 and, optionally, the condensed water can serve to drive hydrocarbons in the reservoir towards a production well, thereby achieving enhanced gas recovery. Injecting both water and gas into the reservoir for EGR can also be referred to as a "Water-Alternating-Gas" (WAG) process.

The systems and methods described relative to FIG. 1 preferably relate to self-sustaining offshore facilities where about 80 mol % or more (or about 80 mol % to 100 mol %, or about 90 mol % to 100 mol %, or about 95 mol % to 100 mol %) of the hydrocarbon in the produced gas 104 is consumed in combustion and/or a portion of the compressed gas 122. Therefore, the production from the offshore facility consists essentially of (or consists of) the power 112, the compressed gas 122, the nitrogen-enriched flue gas, and any byproducts from the one or more purification units 106. Herein, a "hydrocarbon-derived export" from an offshore facility refers to a commodity containing hydrocarbon or derived from hydrocarbon in the produced gas that is transported from the offshore facility to another location for use. The hydrocarbon-derived exports from a self-sustaining offshore facility described in FIG. 1 consists essentially of (or consists of) the power 112. Additionally, compressed gas 122 is produced by the processes herein for reuse in the overall system as an EGR fluid.

Therefore, a method of the present disclosure includes: providing an offshore facility comprising a gas turbine 110, and a gas separator 116; producing a produced gas 104 from a gas reservoir 102 to the offshore facility; combusting the produced gas 104 in the gas turbine 110 to produce power 112 and a flue gas 114; at least partially removing nitrogen from the flue gas 114 in a gas separator 116 to produce a carbon dioxide-enriched flue gas 118 and a nitrogen-enriched flue gas; compressing the carbon dioxide-enriched flue gas 118 in a gas compressor 120 to produce a compressed gas 122; and injecting the compressed gas from the gas compressor 120 into the gas reservoir 102, wherein 80 mol % or more (or 90 mol % or more, or essentially all) of hydrocarbon in the produced gas 104 is combusted and/or injected into the gas reservoir 102.

Further, a system like an offshore facility of the present disclosure includes: an offshore production unit configured for producing a produced gas offshore facility 104 from a gas reservoir 102; a gas turbine 110 configured to receive the produced gas 104 for producing power 112 and a flue gas 114; a gas separator 116 configured to receive the flue gas 114 for at least partially removing nitrogen from the flue gas 114 and for producing a carbon dioxide-enriched flue gas 118 and a nitrogen-enriched flue gas; a gas compressor 120 configured to receive the carbon dioxide-enriched flue gas 118 for producing a compressed gas 122; and an injection unit configured for injecting the compressed gas 122 from the gas compressor 120 into the gas reservoir 102.

Figure 2:
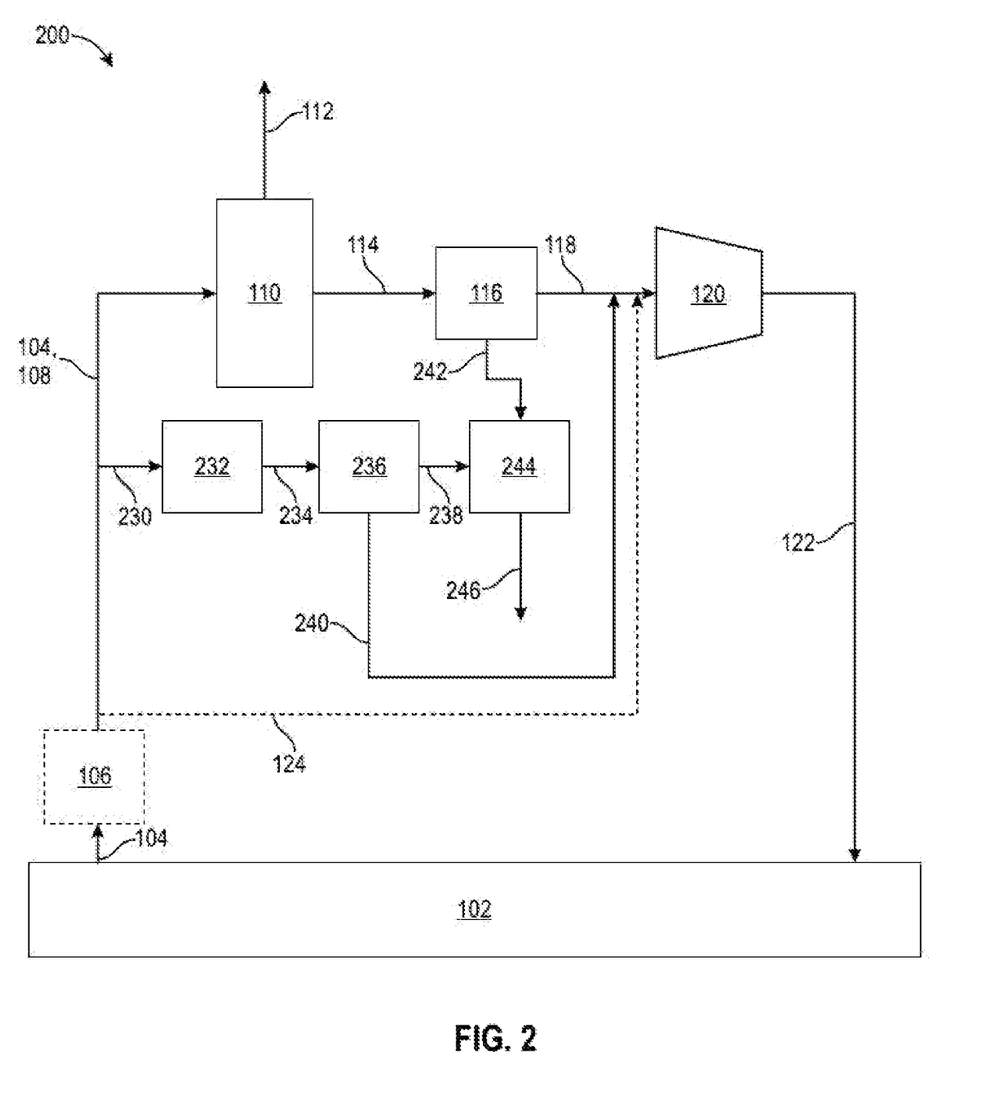
FIG. 2 is another non-limiting example flow diagram of a method for power generation and $CO_2$ injection of the present disclosure.

FIG. 2, with continued reference to FIG. 1, is another non-limiting example flow diagram of a method 200 for power generation, ammonia production, and $CO_2$ injection of the present disclosure. In this method, the nitrogen from separation of the flue gas and excess produced gas are used as feedstocks to produce ammonia and carbon dioxide. The resultant carbon dioxide can be combined with the carbon dioxide-enriched flue gas for compression and injection.

As illustrated in FIG. 2, produced gas 104 from the reservoir 102 is directed to gas turbine 110, and a portion 230 of the produced gas 104 (or purified produced gas 108) is directed to a reformer 232. The produced gas 104 (or purified produced gas 108) is combusted in the gas turbine 110 to produce energy 112 and flue gas 114. The flue gas 114 is separated in gas separator 116 into carbon dioxide-enriched flue gas 118 and nitrogen-enriched flue gas 242. The nitrogen-enriched flue gas 242 is directed to an ammonia reactor 244 to produce ammonia 246.

The reformer 232 converts the portion 230 of the produced gas 104 (or purified produced gas 108) in the presence of water into hydrogen and carbon dioxide, illustrated as stream 234. The water can be purified from sea water and/or condensed water from the combustion process. The reformer 232 may be for steam reforming and include a downstream unit for a water-gas-shift reaction. In FIG. 2 the reforming step is illustrated with a single box, but may include one or more reactors and multiple reactions. For example, the reactions may include, catalytic steam reforming followed by water-gas-shift reacting to yield stream 234 comprising hydrogen and carbon dioxide 234. The catalyst steam reforming can be conducted by methods and systems described in Liu, Ke; Song, Chunshan; Subramani, Velu, eds. (2009), pages 14-126, *Hydrogen and Syngas Production and Purification Technologies*, doi:10.1002/ 9780470561256, ISBN 9780470561256, which is incorporated herein by reference. The water-gas-shift reaction can be conducted by methods and systems described in *Catalyst Handbook* Second Edition (1996) Chapter 6, edited by Martyn V. Twigg, which is incorporated herein by reference.

The stream 234 can then be separated (e.g., using a membrane filtration process, a cold fraction process, an extractive distillation, and the like, and any combination thereof) in a gas separator 236 into a hydrogen stream 238 and a carbon dioxide stream 240. The carbon dioxide stream 240 can be combined with the carbon dioxide-enriched flue gas 118 before compression. The hydrogen stream 238 and the nitrogen-enriched flue gas 242 can be reacted in the ammonia reactor 244 to yield the ammonia 246 via the Haber-Bosch Process or other ammonia production processes. The Haber-Bosch Process (ammonia production reaction) can be conducted by methods and systems described in *Appl, M*. (1982), The Haber-Bosch Process and the Development of Chemical Engineering: A Century of Chemical Engineering, pages 29-54, ISBN 978-0-306-40895-3, which is incorporated herein by reference.

Optionally, a portion 124 of the produced gas 104 (or purified produced gas 108) can be diverted and combined with the carbon dioxide-enriched flue gas 118 and carbon dioxide stream 240. The combination of the carbon dioxide-enriched flue gas 118, carbon dioxide stream 240, and optionally the portion 124 of the produced gas 104 are compressed in gas compressor 120 to yield compressed gas 122. The compressed gas 122 is then injected into the reservoir 102 for EGR and/or sequestration.

The systems and methods described relative to FIG. 2 preferably relate to self-sustaining offshore facilities where about 80 mol % or more (or about 80 mol % to 100 mol %, or about 90 mol % to 100 mol %, or about 95 mol % to 100 mol %) of the hydrocarbon in the produced gas 104 is used in combusting, reforming, and (if stream 124 is included) a portion of the compressed gas 122. Therefore, the production from the offshore facility consists essentially of (or consists of) the power 112, the compressed gas 122, the ammonia 246, and any byproducts from the one or more purification units 106. The hydrocarbon-derived exports from a self-sustaining offshore facility described in FIG. 1 consists essentially of (or consists of) the power 112, and the ammonia 246. Additionally, compressed gas 122 is produced by the processes herein for reuse in the overall system as an EGR fluid.

Therefore, methods of the present disclosure include: providing an offshore facility comprising a gas turbine 110, a first gas separator 116, a reformer 232, a second gas separator 236, and an ammonia reactor 244; producing a produced gas 104 from a gas reservoir 102 to the offshore facility; combusting the produced gas 104 in a gas turbine 110 to produce power 112 and a flue gas 114; at least partially removing nitrogen from the flue gas 114 in the first gas separator 116 to produce a carbon dioxide-enriched flue gas 118 and a nitrogen-enriched flue gas 242; reforming a portion 230 of the produced gas 104 in the reformer 232 to produce a stream 234 comprising hydrogen and carbon dioxide; at least partially separating the carbon dioxide in the second gas separator 236 from the stream 234 to yield a carbon dioxide stream 240 and a hydrogen stream 238; reacting the hydrogen stream 238 and the nitrogen-enriched flue gas 242 in the ammonia reactor 244 to yield ammonia 246; combining and compressing the carbon dioxide stream 240 and the carbon dioxide-enriched flue gas 118 in a gas compressor 120 to produce a compressed gas 122; and injecting the compressed gas 122 from the gas compressor 120 into the gas reservoir 102, wherein 80 mol % or more (or 90 mol % or more, or essentially all) of hydrocarbon in the produced gas 104 is combusted, reformed, and/or injected into the gas reservoir 102.

Therefore, a system of the present disclosure include: an offshore production unit configured for producing a produced gas 104 from a gas reservoir 102; a gas turbine 110 configured to receive the produced gas 104 for producing power 112 and a flue gas 114; a first gas separator 116 configured to receive the flue gas 114 for at least partially removing nitrogen from the flue gas 114 and for producing a carbon dioxide-enriched flue gas 118 and a nitrogen-enriched flue gas 242; a reformer 232 configured to receive a portion 230 of the produced gas 104 from upstream of the gas turbine 110 for producing a stream 234 comprising carbon dioxide and hydrogen; a second gas separator 236 configured to receive the stream 234 for at least partially removing carbon dioxide from the stream 234 and for producing a carbon dioxide stream 240 and a hydrogen stream 238; an ammonia reactor 244 configured to receive the hydrogen stream 238 and the nitrogen-enriched flue gas 242 for producing ammonia 246; a gas compressor 120 configured to receive the carbon dioxide-enriched flue gas 118 and the carbon dioxide stream 240 for producing a compressed gas 122; and an injection unit configured for injecting the compressed gas 122 from the gas compressor 120 into the gas reservoir 102.

FIGS. 1 and 2 provide non-limiting examples and description of methods and systems of the present disclosure. One skilled in the art will recognize other components that may be included for proper and safe operability of said methods. Examples of other components include, but are not limited to, flow meters, sensors, heat exchangers, valves, and the like, and any combination thereof.

The offshore facility on which the gas turbine, gas separator, gas compressor, and optionally ammonia reactor reside may be a low motion floater selected from a group consisting of: a semi-submersible, a ship-shaped monohull, and the like, and any combination thereof. Thus, a relative low roll motion floater may be employed in order to host all gas processing and power generation facilities. The sizing and weight of topside facilities may be super-linear to the gas treating volumes. The super-linear relation means that once beyond a threshold, the increase of top facilities' weights and sizing due to the increase of gas throughput may be larger than the case when the total sizing and weights are below the threshold. Therefore, a large, stable floater may be used to serve as the platform for all processing facilities. For example, a lager bilge keel below the hull can help to provide a better stability for the floater. In terms of the size and width, a typical Very Large Crude Carrier (VLCC) type of vessel can serve as a base model, with the standard dimensions ranging from about between 300 meters to 330 meters in length, 58 meters breadth, and 31 meters in depth.

Semi-submersible can be a substantially stable and cost effective platform for offshore gas processing and power generation. Column-stabilized or Bottle-type semisubmersible can both be applicable for purposes of the present disclosure. Indeed, column-stabilized or bottle-type semi-submersible can offer exceptional stability for gas treating and power generation operations, thus reducing rolling and pitching from waves and wind. Semisubmersible can also be a suitable example as a low motion floater since it can handle harsh weather and the drastic ocean environment.

The ship-shaped monohull is a monohull type of flow power regeneration and $CO_2$ re-injection (FPGCR), which shares similarity with the floating production storage and offloading unit (FPSO), except that the storage function of the latter are removed and the gas handling and power generation modules are added. An FPSO consists of a large tanker type vessel moored to a seafloor. An FPSO is designed to process and stow production from nearby subsea wells and to periodically offload the stored compressed gas to a smaller shuttle tanker. The shuttle tanker then transports the compressed gas to an onshore facility for further processing. An FPSO may be suited for marginally economic fields located in remote deep-water areas where a pipeline infrastructure does not exist. The cargo space inside the monohull can fit power generation units and carbon capture facilities. The sizing of the monohull scales super-linearly with the gas treating volumes.

Alternative position-keeping configurations can be used for the semi-submersible and the ship-shaped monohull floaters, such as Dynamic Positioning (DP). It allows faster deployment and mobility than a traditional mooring line type of approach. DP can easily use the generated power, thus making itself more attractive. Moreover, no anchor handling tugs are required. Also, DP is water depth and seabed insensitive.

Methods for offshore power generation and $CO_2$ injection according to the present disclosure may further comprise: controlling a position of the low motion floater by a computer-controlled system.

The offshore facility may comprise one or more gas turbines configured to provide the power to one or more FPSOs within operating range. The offshore facility may be a fixed platform, a floating system on a sea surface, a suspended system in a water column or sit on a sea bed, or a combination thereof. The offshore facility may be a low motion floater, such as a semi-submersible, or a ship-shaped monohull.

A computer-controlled system may be configured for controlling a position of the low motion floater. The computer-controlled system can receive the power from the gas turbine. Herein, the gas turbine may use sea water for cooling flue gas.

Consequently, methods and apparatus of the present disclosure can successfully facilitate an enhanced hydrocarbon recovery.

The power can be stored, consumed either on board or by nearby subsea equipment, transmitted via cables to onshore gird or transported by battery ship, or a combination thereof. Furthermore, the power may be provided at high voltage alternative current (HVAC), at high voltage direct current (HVDC), or a combination thereof.

Figure 3:
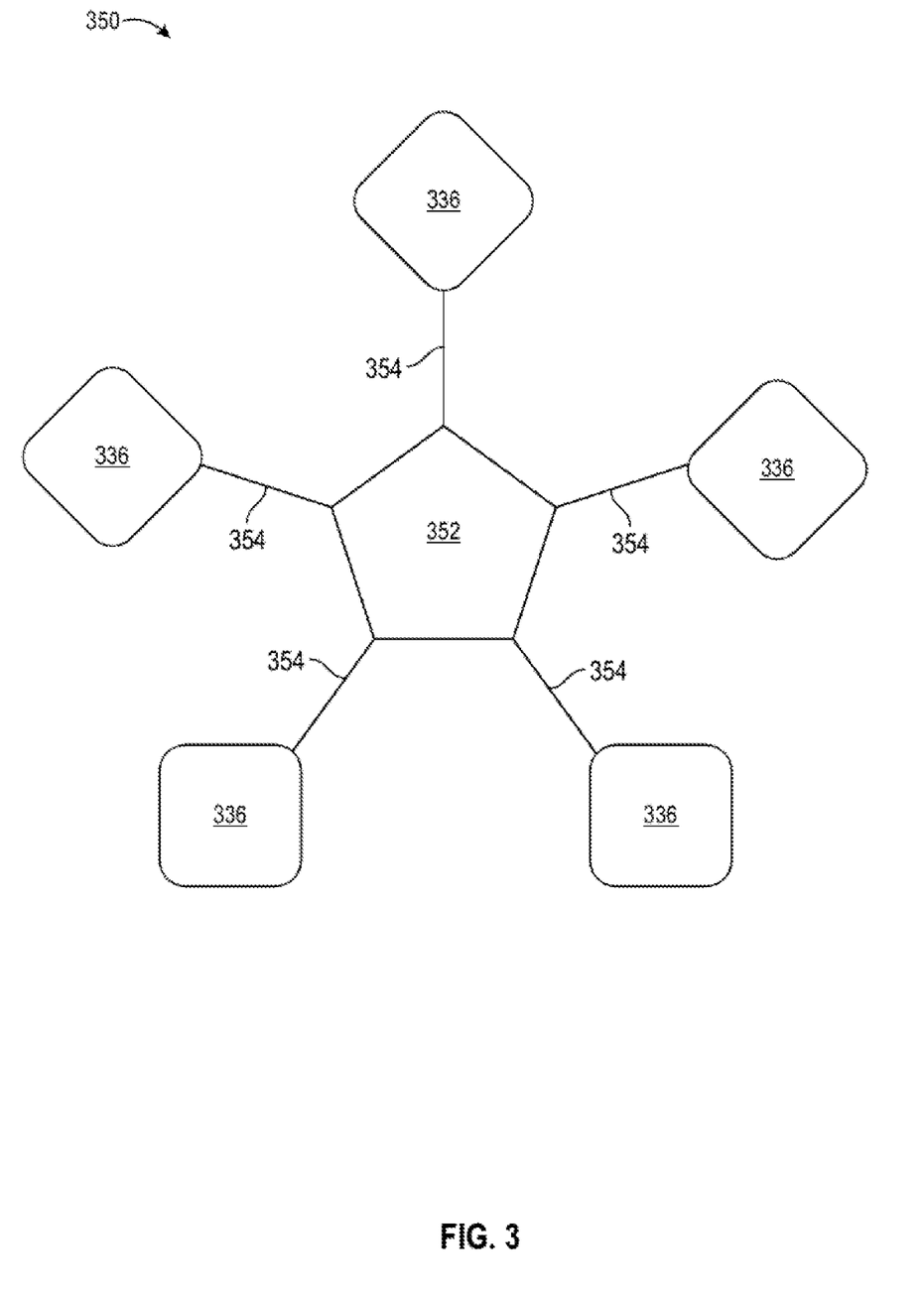
FIG. 3 is a flow diagram of an integrated field development enabled by the power generation and $CO_2$ injection.

FIG. 3 is a flow diagram of an integrated field development 350 enabled by the power generation and $CO_2$ injection. A centralized power generation unit 352 (e.g., described relative to FIGS. 1 and 2) can provide power 354 to nearby floating production storage and offloading unit(s) (FPSOs) 336 within the operating range. In this way, the power generation modules on each FPSO 336 can be removed (or reduced in size), giving more space to gas production and compression equipment. Furthermore, the said integrated field development 350 may enhance each FPSO's production throughput by providing a significantly larger amount of power 354 usually confined by the limited space and weight on board. Thus, the power 354 can be provided to one or more production platforms within operating range, wherein the one or more production platforms may be floating structures (e.g., FPSO 336). The power 354 may be provided at high voltage alternative current (HVAC), at high voltage direct current (HVDC), or a combination thereof.

CO$_2$ Separation Methods and Systems

Herein, the CO$_2$ separation may comprise a separation process selected from a group consisting of: a membrane filtration process, a cold fraction process, an extractive distillation, and the like, and any combination thereof. The selection of CO$_2$ removal process may depend on the gas volume, composition and pressures.

For example, separation using a membrane filtration process relates to gas treating membrane systems providing a safe and efficient option for CO$_2$ removal from natural gas, especially in remote areas. The separation is based on gas permeation speed (diffusivity and solubility), wherein the driving force is based on a partial pressure difference. For example, the residue gas (hydrocarbons) can stay in the high pressure residue gas stream. Membrane systems can be extremely adaptable to gas volume, CO$_2$ concentration, and feed gas specifications. Such separation process is preferred over other available technologies when the operating pressure is over 450 psig, the electricity is abundant, and the space and weight is confined like in the offshore environment. The separation process may be based on gas permeation speed, also known as selective permeation. Components with higher permeation rates (such as CO$_2$, H$_2$, and H$_2$S) may permeate with a faster speed through the membrane system than other components with lower permeation rates (such as N$_2$, methane, ethane and heavier hydrocarbons. Thus, in the case of CO$_2$ removal from the produced gas, a feed gas can be separated into a methane-enriched (residual) stream on the exterior of the membrane fiber and a carbon dioxide-enriched (permeate) stream on the interior of the membrane fiber. In the case of CO$_2$ removal from the flue gas, a flue gas can be separated into a CO$_2$-enriched stream and a nitrogen-enriched stream. The primary driving force of the separation can be the partial pressure difference of the permeating component. Therefore, the pressure difference between the feed gas and permeate gas and the concentration of the permeating component can determine the product purity and the amount of carbon dioxide membrane surface required. A higher differential pressure will require a smaller membrane. For instance, bulk removal process exists for onshore and offshore applications, with capacity of feed gas up to 700 MMSCFD. The membrane system can process feed gas with 3% to 90% CO$_2$ and generate residual gas with 2% to 80% CO$_2$. A single or a plurality of guard beds may be employed in case of the presence of sulfur and heavy metals like mercury. Non-limiting examples of membranes for CO$_2$ separation may include: CYNARA® (an acid gas membrane system used for CO$_2$ and H$_2$S removal; available from Schlumberger™), APURA® (designed for use in high-pressure, medium- to low-CO$_2$ applications for bulk and fine removal of components such as water, CO$_2$, and H$_2$S; available from Schlumberger™), UOP SEPAREX™ membrane (available from Honeywell UOP™), MEDAL™ membrane (available from Air Liquide™), and PEEK™ membrane (available from Air Liquide™).

Furthermore, the separation of CO$_2$ from the flue gas may be performed using a cold fractionation process that deals with CO$_2$ freezing in a special section of the distillation column, known as CONTROLLED FREEZE ZONE™ (also referred to as "CFZ"; available from ExxonMobil™).

Furthermore, the separation of CO$_2$ from the flue gas may be performed using a cold distillation technology wherein a hydrocarbon solvent can be used to suppress CO$_2$ freezing, known as the "Extractive Distillation" (available from Chart Industries™).

Methods for offshore power generation and CO$_2$ injection according to the present disclosure may further comprise: diverting a portion of the produced gas from upstream of the gas turbine to downstream of the gas separator.

Example Embodiments

A first non-limiting example embodiment is a method comprising: providing an offshore facility comprising a gas turbine, and a gas separator; producing a produced gas from a gas reservoir to the offshore facility; combusting the produced gas in a gas turbine to produce power and a flue gas; at least partially removing nitrogen from the flue gas in a gas separator to produce a carbon dioxide-enriched flue gas and a nitrogen-enriched flue gas; compressing the carbon dioxide-enriched flue gas in a gas compressor to produce a compressed gas; and injecting the compressed gas from the gas compressor into the gas reservoir, wherein 80 mol % or more of hydrocarbon in the produced gas is combusted and/or injected into the gas reservoir. The first non-limiting example embodiment may include one or more of the following: Element 1: wherein hydrocarbon-derived exports from the offshore facility consists essentially of the power; Element 2: the method further comprising: purifying the produced gas upstream of the gas turbine to at least partially remove one or more of: carbon dioxide, nitrogen, a heavy metal, and hydrogen sulfide; Element 3: Element 2 and wherein the purifying at least partially removes carbon dioxide, and wherein the method further comprises: adding the carbon dioxide to the carbon dioxide-enriched flue gas before compressing the carbon dioxide-enriched flue gas; Element 4: the method further comprising: diverting a portion of the produced gas upstream of the gas turbine; and adding the portion of the produced gas to the carbon dioxide-enriched flue gas before compressing the carbon dioxide-enriched flue gas; Element 5: wherein the produced gas comprises a gas selected from the group consisting of: steam, hydrogen, helium, nitrogen, carbon monoxide, carbon dioxide, hydrogen sulfide, one or more $C_1$-$C_4$ hydrocarbons, metal-containing compounds, and any combination thereof; Element 6: Element 5 and wherein the produced gas comprises a combined carbon dioxide and nitrogen content of about 25 mol % or greater; Element 7: wherein the produced gas has a gas volume of about 1 MMSCFD or greater; Element 8: wherein the produced gas has a gas volume of about 50 MMSCFD to about 500 MMSCFD; Element 9: the method further comprising: condensing a water vapor from the flue gas to produce a liquid water; and injecting the liquid water with the compressed gas into the gas reservoir; Element 10: wherein the power is from 500 megawatts (MW) to 3 gigawatts (GW); Element 11: wherein the power is stored, consumed either on board or by nearby subsea equipment, transmitted via cables to onshore grid or transported by battery ship, or a combination thereof; Element 12: the method further comprising: providing the power to one or more production platforms within operating range, wherein the one or more production platforms are floating structures; Element 13: Element 12 and wherein the power is comprised of a high voltage alternative current (HVAC), a high voltage direct current (HVDC), or a combination thereof; Element 14: wherein the offshore facility is a low motion floater selected from a group consisting of: a semi-submersible, a ship-shaped monohull, and a combination thereof; Element 15: Element 14 and the method further comprising: controlling a position of the low motion floater by a computer-controlled system; and Element 16: the method further comprising: cooling the flue gas with sea water. Examples of combinations include, but are not limited to, Element 1 in combination with one or more of Elements 2-16; Element 2 (optionally in combination with Element 3) in combination with one or more of Elements 4-16; Element 4 in combination with one or more of Elements 5-16; Element 5 (optionally in combination with Element 6) in combination with one or more of Elements 7-16; Element 7 or Element 8 in combination with one or more of Elements 9-16; Element 9 in combination with one or more of Elements 10-16; Element 10 in combination with one or more of Elements 11-16; Element 11 in combination with one or more of Elements 12-16; Element 12 (optionally in combination with Element 13) in combination with one or more of Elements 14-16; and Element 14 (optionally in combination with Element 15) in combination with Element 16.

A second non-limiting example embodiment is an offshore facility comprising: an offshore production unit configured for producing a produced gas from a gas reservoir; a gas turbine configured to receive the produced gas for producing power and a flue gas; a gas separator configured to receive the flue gas for at least partially removing nitrogen from the flue gas and for producing a carbon dioxide-enriched flue gas and a nitrogen-enriched flue gas; a gas compressor configured to receive the carbon dioxide-enriched flue gas for producing a compressed gas; and an injection unit configured for injecting the compressed gas from the gas compressor into the gas reservoir. The second non-limiting example embodiment may further include one or more of: Element 17: wherein hydrocarbon-derived exports from the offshore facility consists essentially of the power; Element 18: the system further comprising: one or more purification units configured to receive the produced gas upstream of the gas turbine to at least partially remove one or more of: carbon dioxide, nitrogen, a heavy metal, and hydrogen sulfide; Element 19: Element 18 and wherein the one or more purification units at least partially removes carbon dioxide, and wherein the system further comprises: lines configured for combining the carbon dioxide with the carbon dioxide-enriched flue gas and the carbon dioxide stream before compressing the carbon dioxide-enriched flue gas; Element 20: the system further comprising: a line configured for diverting a portion of the produced gas upstream of the gas turbine and adding the portion of the produced gas to the carbon dioxide-enriched flue gas before compressing the carbon dioxide-enriched flue gas; Element 21: the system further comprising: one or more units configured for condensing a water vapor from the flue gas to produce a liquid water; Element 22: the system further comprising: units (e.g., batteries, fuel cells, power lines, and the like) configure for (a) the storing and/or consuming the power either on board and/or (b) transmitting (e.g., via lines or battery ships) the power to nearby subsea equipment, one or more production platforms, and/or an onshore grid; Element 23: wherein the offshore facility is a low motion floater selected from a group consisting of: a semi-submersible, a ship-shaped monohull, and a combination thereof; Element 24: Element 23 and the system further comprising: a computer-controlled system configured for controlling a position of the low motion floater; and Element 25: the system further comprising: a unit configured for cooling the flue gas with sea water. Examples of combinations include, but are not limited to, Element 17 in combination with one or more of Elements 18-25; Element 18 (optionally in combination with Element 19) in combination with one or more of Elements 20-25; Element 20 in combination with one or more of Elements 21-25; Element 21 (optionally in combination with Element 22) in combination with one or more of Elements 23-25; and Element 23 (optionally in combination with Element 24) in combination with Element 25.

A third non-limiting example embodiment is a method comprising: providing an offshore facility comprising a gas turbine, a first gas separator, a reformer, a second gas separator, and an ammonia reactor; producing a produced gas from a gas reservoir to the offshore facility; combusting the produced gas in a gas turbine to produce power and a flue gas; at least partially removing nitrogen from the flue gas in the first gas separator to produce a carbon dioxide-enriched flue gas and a nitrogen-enriched flue gas; reforming a portion of the produced gas in the reformer to produce a stream comprising hydrogen and carbon dioxide; at least partially separating the carbon dioxide in the second gas separator from the stream to yield a carbon dioxide stream and a hydrogen stream; reacting the hydrogen stream and the nitrogen-enriched flue gas in the ammonia reactor to yield ammonia; combining and compressing the carbon dioxide stream and the carbon dioxide-enriched flue gas in a gas compressor to produce a compressed gas; and injecting the compressed gas from the gas compressor into the gas reservoir, wherein 80 mol % or more of hydrocarbon in the produced gas is combusted, reformed, and/or injected into the gas reservoir. The third non-limiting example embodiment may further include one or more of: Element 26: wherein hydrocarbon-derived exports from the offshore facility consists essentially of the power and the ammonia; Element 27: the method further comprising: purifying the produced gas upstream of the gas turbine to at least partially remove one or more of: carbon dioxide, nitrogen, a heavy metal, and hydrogen sulfide; Element 28: Element 27 and wherein the purifying at least partially removes carbon dioxide, and wherein the method further comprises: combining the carbon dioxide with the carbon dioxide-enriched flue gas and the carbon dioxide stream before compressing the carbon dioxide-enriched flue gas; Element 29: the method further comprising: diverting a portion of the produced gas upstream of the gas turbine; and adding the portion of the produced gas to the carbon dioxide-enriched flue gas before compressing the carbon dioxide-enriched flue gas; Element 30: wherein the produced gas comprises a gas selected from the group consisting of: steam, hydrogen, helium, nitrogen, carbon monoxide, carbon dioxide, hydrogen sulfide, one or more $C_1$-$C_4$ hydrocarbons, metal-containing compounds, and any combination thereof; Element 31: Element 30 and wherein the produced gas comprises a combined carbon dioxide and nitrogen content of about 25 mol % or greater; Element 32: wherein the produced gas has a gas volume of about 1 MMSCFD or greater; Element 33: wherein the produced gas has a gas volume of about 50 MMSCFD to about 500 MMSCFD; Element 34: the method further comprising: condensing a water vapor from the flue gas to produce a liquid water; and injecting the liquid water with the compressed gas into the gas reservoir; Element 35: wherein the power is from 500 megawatts (MW) to 3 gigawatts (GW); Element 36: wherein the power is stored, consumed either on board or by nearby subsea equipment, transmitted via cables to onshore grid or transported by battery ship, or a combination thereof; Element 37: the method further comprising: providing the power to one or more production platforms within operating range, wherein the one or more production platforms are floating structures; Element 38: Element 37 and wherein the power is comprised of a high voltage alternative current (HVAC), a high voltage direct current (HVDC), or a combination thereof; Element 39: wherein the offshore facility is a low motion floater selected from a group consisting of: a semi-submersible, a ship-shaped monohull, and a combination thereof; Element 30: Element 39 and the method further comprising: controlling a position of the low motion floater by a computer-controlled system; and Element 41: the method further comprising: cooling the flue gas with sea water. Examples of combinations include, but are not limited to, Element 26 in combination with one or more of Elements 27-41; Element 27 (optionally in combination with Element 28) in combination with one or more of Elements 29-41; Element 29 in combination with one or more of Elements 30-41; Element 30 (optionally in combination with Element 31) in combination with one or more of Elements 32-41; Element 32 or Element 33 in combination with one or more of Elements 34-41; Element 34 in combination with one or more of Elements 35-41; Element 35 in combination with one or more of Elements 36-41; Element 36 in combination with one or more of Elements 37-41; Element 37 (optionally in combination with Element 38) in combination with one or more of Elements 39-41; and Element 39 (optionally in combination with Element 40 in combination with Element 41.

A fourth non-limiting example embodiment is an offshore facility comprising: an offshore production unit configured for producing a produced gas from a gas reservoir; a gas turbine configured to receive the produced gas for producing power and a flue gas; a first gas separator configured to receive the flue gas for at least partially removing nitrogen from the flue gas and for producing a carbon dioxide-enriched flue gas and a nitrogen-enriched flue gas; a reformer configured to receive a portion of the produced gas from upstream of the gas turbine for producing a stream comprising carbon dioxide and hydrogen; a second gas separator configured to receive the stream for at least partially removing carbon dioxide from the stream and for producing a carbon dioxide stream and a hydrogen stream; an ammonia reactor configured to receive the hydrogen stream and the nitrogen-enriched flue gas for producing ammonia; a gas compressor configured to receive the carbon dioxide-enriched flue gas and the carbon dioxide stream for producing a compressed gas; and an injection unit configured for injecting the compressed gas from the gas compressor into the gas reservoir. The fourth non-limiting example embodiment may further include one or more of: Element 42: wherein hydrocarbon-derived exports from the offshore facility consists essentially of the power and the ammonia; Element 43: the system further comprising: one or more purification units configured to receive the produced gas upstream of the gas turbine to at least partially remove one or more of: carbon dioxide, nitrogen, a heavy metal, and hydrogen sulfide; Element 44: Element 43 and wherein the one or more purification units at least partially removes carbon dioxide, and wherein the system further comprises: lines configured for combining the carbon dioxide with the carbon dioxide-enriched flue gas and the carbon dioxide stream before compressing the carbon dioxide-enriched flue gas; Element 45: the system further comprising: a line configured for diverting a portion of the produced gas upstream of the gas turbine and adding the portion of the produced gas to the carbon dioxide-enriched flue gas before compressing the carbon dioxide-enriched flue gas; Element 46: the system further comprising: one or more units configured for condensing a water vapor from the flue gas to produce a liquid water; Element 47: the system further comprising: units (e.g., batteries, fuel cells, power lines, and the like) configured for (a) the storing and/or consuming the power either on board and/or (b) transmitting (e.g., via lines or battery ships) the power to nearby subsea equipment, one or more production platforms, and/or an onshore grid; Element 48: wherein the offshore facility is a low motion floater selected from a group consisting of: a semi-submersible, a ship-shaped monohull, and a combination thereof; Element 49: Element 48 and the system further comprising: a computer-controlled system configured for controlling a position of the low motion floater; and Element 50: the system further comprising: a unit configured for cooling the flue gas with sea water. Examples of combinations include, but are not limited to, Element 42 in combination with one or more of Elements 43-50; Element 43 (optionally in combination with Element 44) in combination with one or more of Elements 45-50; Element 45 in combination with one or more of Elements 46-50; Element 46 (optionally in combination with Element 47) in combination with one or more of Elements 48-50; and Element 48 (optionally in combination with Element 49) in combination with Element 50.

All documents described herein are incorporated by reference herein for purposes of all jurisdictions where such practice is allowed, including any priority documents and/or testing procedures to the extent they are not inconsistent with this text. As is apparent from the foregoing general description and the specific embodiments, while forms of the disclosure have been illustrated and described, various modifications can be made without departing from the spirit and scope of the disclosure. Accordingly, it is not intended that the disclosure be limited thereby. For example, the compositions described herein may be free of any component, or composition not expressly recited or disclosed herein. Any method may lack any step not recited or disclosed herein. Likewise, the term "comprising" is considered synonymous with the term "including." Whenever a method, composition, element or group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

Whenever a numerical range with a lower limit and an upper limit is disclosed, any number and any included range falling within the range is specifically disclosed, including the lower limit and upper limit. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to one having ordinary skill in the art and having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein.

What is claimed is:

1. A method comprising:
providing an offshore facility comprising a gas turbine, and a gas separator;
producing a produced gas from a gas reservoir to the offshore facility;
combusting the produced gas in a gas turbine to produce power and a flue gas;
at least partially removing nitrogen from the flue gas in a gas separator to produce a carbon dioxide-enriched flue gas and a nitrogen-enriched flue gas;
reforming a portion of the produced gas to produce a stream comprising hydrogen and carbon dioxide;
at least partially separating the carbon dioxide from the stream to yield a carbon dioxide stream and a hydrogen stream;
reacting the hydrogen stream and the nitrogen-enriched flue gas to yield ammonia;
combining and compressing the carbon dioxide stream and the carbon dioxide-enriched flue gas in a gas compressor to produce a compressed gas; and
injecting the compressed gas from the gas compressor into the gas reservoir, wherein at least some of hydrocarbon in the produced gas is combusted, reformed, and/or injected into the gas reservoir.

2. The method of claim 1, wherein hydrocarbon-derived exports from the offshore facility consists essentially of the power and the ammonia.

3. The method of claim 1, further comprising: purifying the produced gas upstream of the gas turbine to at least partially remove one or more of:
carbon dioxide, nitrogen, a heavy metal, and hydrogen sulfide.

4. The method of claim 3, wherein the purifying at least partially removes carbon dioxide, and wherein the method further comprises:
adding the carbon dioxide to the carbon dioxide-enriched flue gas before compressing the carbon dioxide-enriched flue gas.

5. The method of claim 1, further comprising:
diverting a portion of the produced gas upstream of the gas turbine; and
adding the portion of the produced gas to the carbon dioxide-enriched flue gas before compressing the carbon dioxide-enriched flue gas.

6. The method of claim 1, wherein the produced gas comprises a gas selected from the group consisting of: steam, hydrogen, helium, nitrogen, carbon monoxide, carbon dioxide, hydrogen sulfide, one or more C1-C4 hydrocarbons, metal-containing compounds, and any combination thereof.

7. The method of claim 6, wherein the produced gas comprises a combined carbon dioxide and nitrogen content of about 25 mol % or greater.

8. The method of claim 1, wherein the produced gas has a gas volume of about 1 million standard cubic feet per day (MMSCFD) or greater.

9. The method of claim 1, wherein the produced gas has a gas volume of about 50 MMSCFD to about 500 MMSCFD.

10. The method of claim 1, further comprising:
condensing a water vapor from the flue gas to produce a liquid water; and
injecting the liquid water with the compressed gas into the gas reservoir.

11. The method of claim 1, wherein the power is from 500 megawatts (MW) to 3 gigawatts (GW).

12. The method of claim 1, wherein the power is stored, consumed either on board or by nearby subsea equipment, transmitted via cables to onshore grid or transported by battery ship, or a combination thereof.

13. The method of claim 1, further comprising:
providing the power to one or more production platforms within operating range, wherein the one or more production platforms are floating structures.

14. The method of claim 13, wherein the power is comprised of a high voltage alternative current (HVAC), a high voltage direct current (HVDC), or a combination thereof.

15. The method of claim 1, wherein the offshore facility is a low motion floater selected from a group consisting of: a semi-submersible, a ship-shaped monohull, and a combination thereof.

16. The method of claim 15, further comprising:
controlling a position of the low motion floater by a computer-controlled system.

17. The method of claim 1, further comprising:
cooling the flue gas with sea water.

18. An offshore facility comprising:
an offshore production unit configured for producing a produced gas from a gas reservoir;
a gas turbine configured to receive the produced gas for producing power and a flue gas;
a gas separator configured to receive the flue gas for at least partially removing nitrogen from the flue gas and for producing a carbon dioxide-enriched flue gas and a nitrogen-enriched flue gas, wherein the nitrogen-enriched flue gas is reacted with a hydrogen stream to produce ammonia;
a gas compressor configured to receive the carbon dioxide-enriched flue gas for producing a compressed gas; and
an injection unit configured for injecting the compressed gas from the gas compressor into the gas reservoir.

19. A method comprising:
providing an offshore facility comprising a gas turbine, a first gas separator, a reformer, a second gas separator, and an ammonia reactor;
producing a produced gas from a gas reservoir to the offshore facility;
combusting the produced gas in a gas turbine to produce power and a flue gas;
at least partially removing nitrogen from the flue gas in the first gas separator to produce a carbon dioxide-enriched flue gas and a nitrogen-enriched flue gas;
reforming a portion of the produced gas in the reformer to produce a stream comprising hydrogen and carbon dioxide;
at least partially separating the carbon dioxide in the second gas separator from the stream to yield a carbon dioxide stream and a hydrogen stream;
reacting the hydrogen stream and the nitrogen-enriched flue gas in the ammonia reactor to yield ammonia;
combining and compressing the carbon dioxide stream and the carbon dioxide-enriched flue gas in a gas compressor to produce a compressed gas; and
injecting the compressed gas from the gas compressor into the gas reservoir, wherein 80 mol % or more of hydrocarbon in the produced gas is combusted, reformed, and/or injected into the gas reservoir.

20. The method of claim 19, wherein hydrocarbon-derived exports from the offshore facility consists essentially of the power and the ammonia.

21. The method of claim 19, further comprising:
purifying the produced gas upstream of the gas turbine to at least partially remove one or more of: carbon dioxide, nitrogen, a heavy metal, and hydrogen sulfide.

22. The method of claim 21, wherein the purifying at least partially removes carbon dioxide, and wherein the method further comprises:
combining the carbon dioxide with the carbon dioxide-enriched flue gas and the carbon dioxide stream before compressing the carbon dioxide-enriched flue gas.

23. The method of claim 19, further comprising:
diverting a portion of the produced gas upstream of the gas turbine; and
adding the portion of the produced gas to the carbon dioxide-enriched flue gas before compressing the carbon dioxide-enriched flue gas.

24. An offshore facility comprising:
an offshore production unit configured for producing a produced gas from a gas reservoir;
a gas turbine configured to receive the produced gas for producing power and a flue gas;
a first gas separator configured to receive the flue gas for at least partially removing nitrogen from the flue gas and for producing a carbon dioxide-enriched flue gas and a nitrogen-enriched flue gas;
a reformer configured to receive a portion of the produced gas from upstream of the gas turbine for producing a stream comprising carbon dioxide and hydrogen;
a second gas separator configured to receive the stream for at least partially removing carbon dioxide from the stream and for producing a carbon dioxide stream and a hydrogen stream;
an ammonia reactor configured to receive the hydrogen stream and the nitrogen-enriched flue gas for producing ammonia;
a gas compressor configured to receive the carbon dioxide-enriched flue gas and the carbon dioxide stream for producing a compressed gas; and
an injection unit configured for injecting the compressed gas from the gas compressor into the gas reservoir.

* * * * *